March 24, 1964  J. R. RUHOFF ETAL  3,126,252
AMMONIUM OXYFLUOTANTALATE AND ITS METHOD OF PREPARATION
Filed July 20, 1960
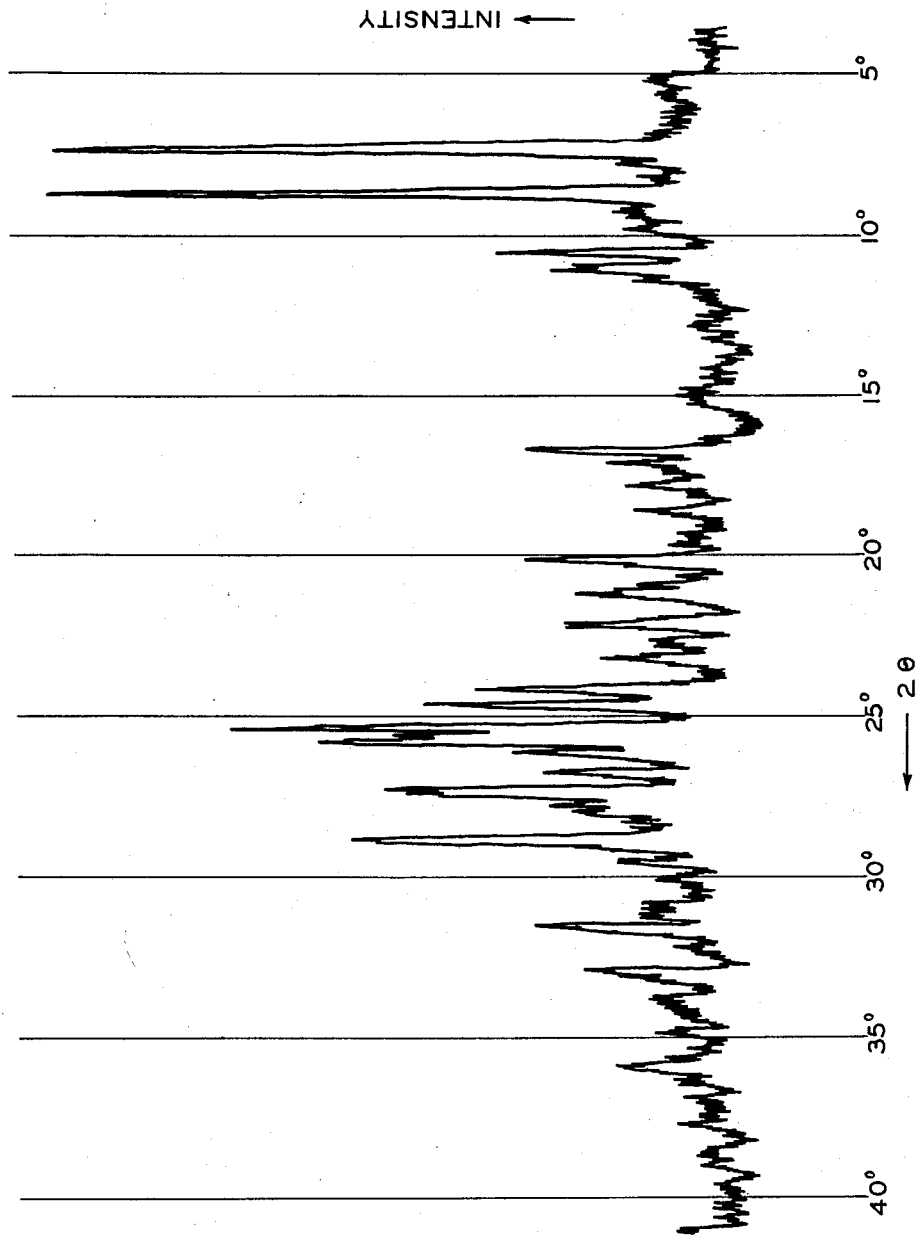

United States Patent Office — 3,126,252, Patented Mar. 24, 1964

3,126,252
AMMONIUM OXYFLUOTANTALATE AND ITS METHOD OF PREPARATION
John R. Ruhoff, Webster Groves, and Charles O. Gerfen, Frontenac, Mo., assignors to Mallinckrodt Chemical Works, St. Louis, Mo., a corporation of Missouri
Filed July 20, 1960, Ser. No. 44,034
3 Claims. (Cl. 23—51)

This invention relates to a process for separating and recovering tantalum values from mixtures of tantalum and columbium values, and to a novel tantalum compound useful therefor.

Briefly the present invention is directed to a process which comprises gradually adding ammonia to a solution containing tantalum values in the form of $(NH_4)_2TaF_7$ and columbium values, the ammonia added being not substantially greater than 3.5 moles of $NH_3$ for each mole of $(NH_4)_2TaF_7$ present in the solution, to precipitate the tantalum values selectively as a crystalline ammonium oxyfluotantalate, and separating the precipitated tantalum values from the solution containing the columbium values. The invention is also directed to a novel crystalline ammonium oxyfluotantalate in which the molar ratio $NH_4^+$:Ta is approximately 1:1 and the molar ratio $F^-$:Ta is approximately 2.5:1.

Among the several objects of this invention are the provision of improved methods for recovering substantially columbium-free tantalum compounds from a mixture of columbium and tantalum values; the provision of methods of the character described in which the tantalum values are precipitated in the form of a crystalline compound substantially free from hydrous oxides of tantalum and columbium; the provision of methods of the character described in which the tantalum and columbium values are recovered from materials in which they are originally present by utilizing the highly soluble ammonium salts of their fluocomplexes; the provision of a novel crystalline fluocomplex of tantalum which is relatively insoluble compared to ordinary ammonium fluotantalate; and the provision of methods for preparing said novel fluocomplex of tantalum. Other objects and features will be in part apparent and in part pointed out hereinafter.

The invention accordingly comprises the products and methods hereinafter described, the scope of the invention being indicated in the following claims.

The single sheet of drawings illustrates a typical X-ray diffraction tracing of the novel crystalline fluocomplex of tantalum of the present invention.

Tantalum has heretofore customarily been separated from columbium by one of several methods, the most common being the old and well-known Marignac process based on the difference in solubility of potassium fluotantalate, $K_2TaF_7$, and potassium oxyfluocolumbate, $K_2CbOF_5$. While the use of the corresponding ammonium salts would appear desirable, because their greater solubility would permit the use of more concentrated solutions with greater efficiency and economy, the solubilities of ammonium fluotantalate and ammonium oxyfluocolumbate are too similar for a practical separation of these salts by fractional crystallization.

A substantial separation of tantalum from columbium employing their ammonium fluocomplexes is possible by the methods described in U.S. Patents 2,859,099, issued November 4, 1958, and 2,895,793, issued July 21, 1959, which are based on the difference in the stability constants of the fluocomplexes. Using these processes, the columbium content can be reduced from as much as 50% or more in the starting material to approximately 5% in the end product, the hydrous oxide of tantalum; but because this oxide is highly adsorptive and readily occludes columbium and other impurities, a reduction of the columbium content below approximately 5% is difficult and ordinarily is not practical.

The present invention is based upon the discovery of a novel crystalline ammonium oxyfluotantalate which is much less soluble in water than ordinary ammonium fluotantalate, $(NH_4)_2TaF_7$, from which is is readily distinguished since the molar ratio $NH_4^+$:Ta in the new compound is 1:1 rather than 2:1 and the molar ratio $F^-$:Ta is 2.5:1 rather than 7:1. X-ray diffraction studies have also shown it to be a new compound having a definite and characteristic crystalline structure and not merely an impure or partially hydrolyzed form of some known tantalum compound. Although the molecular composition of this new tantalum compound has not been definitely established, its empirical composition corresponds to the formula:

$$NH_4TaO(OH)_{1.5}F_{2.5}$$

To separate a mixture of tantalum and columbium values, such as a mixture of tantalum and columbium oxides, in accordance with the present invention, a hot aqueous solution of the oxides is first prepared with hydrofluoric acid and ammonia in such proportions that the tantalum is present as $(NH_4)_2TaF_7$ and the columbium as $(NH_4)_2CbOF_5$. To this solution ammonia is gradually added in an amount not substantially greater than 3.5 moles of $NH_3$ for each mole of $(NH_4)_2TaF_7$ present in the solution, preferably 1.75 to about 3.3 moles, whereupon most of the tantalum values are precipitated in the form of ammonium oxyfluotantalate while the columbium remains in solution as $(NH_4)_2CbOF_5$. The tantalum precipitate is then separated from the mother liquor by filtration or centrifugation. In this manner it is possible to reduce the columbium content by a single precipitation from 5% to 0.12% or less (based on the oxides) with recovery of 80% or more of the tantalum values. By redissolving and reprecipitating the ammonium oxyfluotantalate, the columbium content can be further reduced to 0.015% or less with an overall recovery of 60% or more of the tantalum values.

The chemical reactions involved in the present invention, beginning with a mixture of columbium and tantalum pentoxides, are represented in the following series of equations:

$$Ta_2O_5 + 14HF \rightarrow 2H_2TaF_7 + 5H_2O \qquad (1)$$
$$Cb_2O_5 + 10HF \rightarrow 2H_2CbOF_5 + 3H_2O \qquad (2)$$
$$H_2TaF_7 + 2NH_3 \rightarrow (NH_4)_2TaF_7 \qquad (3)$$
$$H_2CbOF_5 + 2NH_3 \rightarrow (NH_4)_2CbOF_5 \qquad (4)$$
$$(NH_4)_2TaF_7 + 3.5NH_3 + 2.5H_2O \rightarrow$$
$$\qquad NH_4TaO(OH)_{1.5}F_{2.5} + 4.5NH_4F \qquad (5)$$

To achieve optimum separation of tantalum values from columbium values it is important to avoid adding ammonia substantially in excess of 3.5 moles of $NH_3$ for each mole of $(NH_4)_2TaF_7$ present in the solution and to avoid localized concentrations of ammonia which might precipitate some of the tantalum in the form of its gelatinous hydrous oxide. Therefore it is usually preferable not to attempt to convert all of the tantalum to the novel ammonium oxyfluotantalate, but to add only from about 50 to about 95% of the ammonia required for the reaction shown in Equation 5, that is, 1.75 to about 3.3 moles of $NH_3$ for each mole of $(NH_4)_2TaF_7$. It is also desirable, although not essential, to add the ammonia gradually with stirring and to interrupt the addition once or twice, particularly near the end, and allow the mixture to digest and reach equilibrium before adding more ammonia. It is preferred to add the $NH_3$ as a dilute aqueous solution, e.g., 10%.

For maximum recovery of the tantalum values as ammonium oxyfluotantalate, the starting solution of $(NH_4)_2TaF_7$ and $(NH_4)_2CbOF_5$ should be as concentrated as possible. To this end the solution is preferably heated, a temperature of approximately 70 to 90° C. being suitable and convenient. The upper limit will usually correspond to the solubility of $(NH_4)_2TaF_7$, which is equivalent to about 150 g. of $Ta_2O_5$ per liter of solution at 70 to 90° C. It is to be understood that while this represents a preferred mode of carrying out the process, the invention is not limited thereto. More dilute solutions can also be used advantageously provided that the concentration of tantalum as $(NH_4)_2TaF_7$ exceeds its solubility as the ammonium oxyfluotantalate of the present invention.

The precipitated crystals of ammonium oxyfluotantalate will normally contain some adherent mother liquor and therefore be contaminated with traces of soluble ammonium oxyfluocolumbate as well as larger amounts of ammonuim fluoride. Since the solubility of the crystalline ammonium oxyfluotantalate of the present invention corresponds to about 20 to 30 g. of $Ta_2O_5$ per liter, or only about ⅕ the solubility of ordinary ammonium fluotantalate, the crystals may be lightly washed with water to remove the adherent mother liquor and reduce the columbium content still further without losing excessive amounts of tantalum in the wash liquors.

The crystalline fluocomplex of the present invention is stable and it can be dried at 110° C. and stored in suitable containers for considerable periods of time without deteriorating. The product may be used as such, or it may be dissolved in water and hydrolyzed with a base, such as ammonia, to precipitate a pure hydrous oxide of tantalum. Pure tantalum oxide can also be obtained by igniting the crystalline compound at a temperature of about 1000° C.

While the process of the present invention is particularly useful and effective where the starting material contains on the order of 5% columbium oxide, it is also useful for separating mixtures containing much higher proportions of columbium. The process is also effective for separating tantalum from other elements besides columbium, including silicon, titanium, zirconium, hafnium and tin, which elements remain in solution with columbium and are not precipitated with the ammonium oxyfluotantalate of the present invention. Moreover, although the invention has been described above in terms of a starting material consisting of a mixture of tantalum and columbium oxides, it is not limited thereto but is also useful for separating tantalum from mixtures of other tantalum and columbium compounds which can be converted by known methods to a solution of $(NH_4)_2TaF_7$ and $(NH_4)_2CbOF_5$.

The following examples illustrate the invention.

*Example 1*

The starting material was 5,000 ml. of a solution of tantalum and columbium oxides in hydrofluoric acid, the columbium content being 5% by weight of the combined oxides. The composition of this solution was as follows:

Total oxides ($Ta_2O^5$ and
  $Cb_2O_5$) _____ 900 g.
Tantalum _____ 855 g. $Ta_2O_5$, 3.87 moles Ta.
Columbium _____ 45 g. $Cb_2O_5$, 0.34 mole Cb.
Fluoride _____ 534 g. $F^-$, 28.1 moles $F^-$.
Ammonia _____ 61.8 g. $NH_3$, 3.64 moles $NH_3$.

To convert all of the tantalum to $NH_4TaO(OH)_{1.5}F_{2.5}$, 299 g. of $NH_3$ would need to be added. This is calculated as follows: To form $(NH_4)_2TaF_7$ and $(NH_4)_2CbOF_5$ according to Equations 3 and 4, 8.42 moles of $NH_3$ would be required, from which is deducted 3.64 moles for that already present in the solution, leaving 4.78 moles or 81.4 g. of $NH_3$ to be added. To convert all of the $(NH_4)_2TaF_7$ to $NH_4TaO(OH)_{1.5}F_{2.5}$ according to Equation 5, 13.5 moles of $NH_3$ would theoretically be required, but since the amount of fluoride actually present is 0.7 mole less than that called for by Equations 1 and 2, the ammonia requirement is reduced by an equivalent amount so that only 12.8 moles or 218 g. of $NH_3$ is actually needed for this reaction.

The solution was heated to 75° C. and 2460 ml. of 10% $NH_3$ was added at a uniform rate over a period of 30 minutes after which the mixture was allowed to digest for another 30 minutes. An additional 178 ml. of 10% $NH_3$ was then added at a uniform rate over another 30-minute period, the mixture was again allowed to digest for 30 minutes, and this step repeated once more. The total quantity of ammonia added was equivalent to that required to convert 92% of the $(NH_4)_2TaF_7$ to $NH_4TaO(OH)_{1.5}F_{2.5}$. After standing for 30 minutes, the hot solution was cooled to room temperature (30° C.) and filtered on a Büchner funnel. The crystalline cake was washed on the filter with two 250-ml. portions of water and sucked dry. It is characteristic of this moist filter cake that it dissolves rapidly and completely in dilute hydrochloric acid.

The moist filter cake weighed 1008 g. Upon ignition it gave 640 g. of oxide, of which 0.17% was $Cb_2O_5$ and the remainder $Ta_2O_5$. The crystals represented a 75% recovery of the tantalum values (computed as $Ta_2O_5$) originally present in the solution. Analysis of the cake also showed 4.9% $NH_4^+$ and 14.8% $F^-$. The molar ratio $NH_4^+:Ta:F^-$ was therefore 0.96:1:2.7.

To reduce the columbium content still further, a portion of the moist crystals weighing 81.0 g. was slurried with 200 ml. of water in a polyethylene beaker. The slurry contained 50 g. of $Ta_2O_5$ (0.226 mole Ta) and also 3.74 g. (0.220 mole) of $NH_3$ and 12.0 g. (0.632 mole) of $F^-$. It was heated to 75° C. on a steam bath and 51 g. of 48% HF (1.22 moles $F^-$) was added to dissolve the solid completely, after which the solution was diluted to 400 ml. with water. To reconvert all of the tantalum to $NH_4TaO(OH)_{1.5}F_{2.5}$ would require an addition of 21.9 g. of $NH_3$, of which 13.4 g. is needed for the reaction shown in Equation 5. To the hot solution, 184 ml. of 10% $NH_3$ was added over a period of 30 minutes and the mixture was allowed to digest for an additional 30 minutes. Then 20 ml. of 10% $NH_3$ was added over a period of 30 minutes. The total amount of $NH_3$ added was 20.4 g., which would theoretically convert 89% of the $(NH_4)_2TaF_7$ to $NH_4TaO(OH)_{1.5}F_{2.5}$. After the mixture had digested for another 30 minutes, it was cooled to room temperature, filtered on a Büchner funnel, and washed with 84 ml. of water.

Analysis of this cake, weighing 44.9 g., gave the following composition:

|  | Percent |
|---|---|
| Total oxides | 67.1 |
|   $Cb_2O_5$ | 0.015 |
|   $Ta_2O_5$ | >99.98 |
| Fluoride ($F^-$) | 17.1 |
| Ammonia ($NH_4^+$) | 6.05 |

The molar ratio $NH_4^+:Ta:F^-$ in the recrystallized product was therefore 1.10:1:2.95, and the recovery of tantalum (as $Ta_2O_5$) from the recrystallization was 60.4%.

*Example 2*

The tantalum fluocomplex of the present invention, prepared in a manner substantially identical to the process described in Example 1, was subjected to X-ray diffraction analysis. The results of this analysis are shown in the drawing and illustrate the fact that the crystalline fluocomplex is a definite chemical compound. The peaks appearing in the tracing are characteristic for the compound of the present invention and do not correspond to the peaks obtained for any of the tantalum fluocomplexes heretofore known to the art.

Example 3

The following separation was on a larger scale. The starting material, a technical grade of tantalum pentoxide containing 5% $Cb_2O_5$, was dissolved in hydrofluoric acid to give 13.9 gal. of a solution containing the following:

Total oxides ($Cb_2O_5$ and $Ta_2O_5$) _____ 40 lb.
Tantalum _____ 38 lb. $Ta_2O_5$, 0.172 lb. mole Ta.
Columbium _____ 2 lb. $Cb_2O_5$, 0.015 lb. mole Cb.
Fluoride _____ 23.8 lb. $F^-$, 1.253 lb. moles $F^-$.
Ammonia _____ 3.26 lb. $NH_3$, 0.192 lb. mole $NH_3$.

It should be noted that the actual fluoride content is less by 0.025 lb. mole than is called for by Equations 1 and 2. To convert all of the tantalum to $$NH_4TaO(OH)_{1.5}F_{2.5}$$

according to Equations 3–5, 12.9 lb. of $NH_3$ would need to be added of which 9.8 lb. is required for the reaction shown in Equation 5. This is calculated in a manner similar to that described in Example 1.

The solution of the starting material was first heated to 85° C. in a polyethylene-lined drum by blowing steam into it, then diluted with water to 25.4 gal., and to it 109 lb. of 10% $NH_3$ solution was added below the surface of the stirred solution over a 40-minute period. After the solution had digested for 30 minutes, an additional 7.9 lb. of 10% $NH_3$ solution was similarly added over a 40-minute period. The solution was again allowed to digest for 30 minutes, and then another 7.9 lb. of 10% $NH_3$ solution was added as before. The total amount of $NH_3$ added was 12.4 lb. which would theoretically convert 96% of the $(NH_4)_2TaF_7$ to $NH_4TaO(OH)_{1.5}F_{2.5}$. The temperature at this point was 72° C. The mixture was allowed to stand for 15 minutes and then 39 gal. of the clear supernatant mother liquor were decanted. The volume of slurry remaining in the drum was about 3.3 gal. To it was added 9 gal. of water, after which it was stirred for 15 minutes and again allowed to settle for 15 minutes. After decanting 8.5 gal. of the clear supernatant wash liquor, about 3.4 gal. of slurry were left in the drum.

Analysis showed that the slurry contained 31.6 lb. of $Ta_2O_5$ (0.143 lb. mole Ta), representing a recovery of 83.5%. The columbium content was 0.12% by weight as $Cb_2O_5$. The slurry also contained 7.6 lb. of fluoride ($F^-$) and 2.4 lb. of ammonia ($NH_3$). The molar ratio $NH_4^+:Ta:F^-$ was therefore 1.0:1:2.8.

The columbium content was further reduced by dissolving the tantalum salt in sufficient hydrofluoric acid and ammonia to reform $(NH_4)_2TaF_7$ and then reprecipitating $NH_4TaO(OH)_{1.5}F_{2.5}$ as before. To reconvert all of the tantalum to $NH_4TaO(OH)_{1.5}F_{2.5}$, 10.7 lb. of $NH_3$ would need to be added, of which 8.2 lbs. is for the reaction corresponding to Equation 5.

Water and 24.2 lbs. of 48% HF were accordingly added to the slurry in the drum, making the volume 19.5 gal., the mixture was heated to 90° C., and to it 82 lb. of 10% $NH_3$ solution was added with stirring over a 30-minute period. After the mixture had digested for 30 minutes, an additional 17 lb. of 10% $NH_3$ solution was added over a 45-minute period and the solution was again allowed to digest for 30 minutes. This represents the ammonia required to convert 90% of the $(NH_4)_2TaF_7$ to $$NH_4TaO(OH)_{1.5}F_{2.5}$$

After 15 minutes, 25.5 gal. of the clear supernatent mother liquor was decanted. The volume of the slurry remaining in the drum was about 5 gal. To it was added 8 gal. of water. The mixture was then stirred for 1 hour and filtered through a rubber-covered filter press. The wet cake weighed 35.5 lb. and there was 12 gal. of filtrate. Analysis of the cake showed the following:

|  | Lb. |
|---|---|
| Total oxides | 23.3 |
| ($Cb_2O_5$=0.015%) |  |
| Fluoride ($F^-$) | 5.3 |
| Ammonia ($NH_4^+$) | 1.8 |

The molar ratio $NH_4^+:Ta:F^-$ in the crystalline product was 0.95:1:2.66, and it contained 61.3% of the tantalum (as oxide) originally present in the starting material. In this separation the tantalum-columbium ratio was increased by a factor of 350 over that in the original technical tantalum oxide.

Example 4

This example shows the separation of tantalum from a mixture of oxides ($Ta_2O_5$, $Cb_2O_5$ and $TiO_2$) in which the molar ratio of tantalum to columbium (Ta:Cb) was 1:1.4. The oxides, weighing 313.6 g., were in the form of a hydrofluoric acid solution (500 ml.) which contained the following values:

Tantalum _____ 90.4 g. $Ta_2O_5$, 0.408 mole Ta.
Columbium _____ 62.0 g. $Cb_2O_5$, 0.466 mole Cb.
Titanium _____ 1.2 g. $TiO_2$, 0.015 mole Ti.
Fluoride _____ 98.0 g. $F^-$, 5.16 moles $F^-$.
Ammonia _____ 15.7 g. $NH_3$, 0.92 mole $NH_3$.

To convert all of the tantalum to $NH_4TaO(OH)_{1.5}F_{2.5}$, 37.4 g. of $NH_3$ are needed, of which 22.8 g. is required for the reaction shown in Equation 5. In calculating the ammonia requirement, in a manner similar to that described in Example 1, titanium was assumed to be present in the reaction mixture as $(NH_4)_2TiOF_4$.

The solution was transferred to a polyethylene beaker and heated to 75° C. on a steam bath. To it 334 ml. of 10% $NH_3$ solution was gradually added below the surface of the solution with vigorous stirring over a 30-minute period and the mixture allowed to digest for another 30 minutes. An additional 29.6 ml. of 10% $NH_3$ solution was added as before, the mixture allowed to digest for 30 minutes, and this step repeated once more. The total amount of ammonia added was 39.3 g., which represents an excess of 8.3% over that required for the reaction shown in Equation 5. The reaction mixture was filtered with suction on a Büchner filter, the filter cake was washed with 200 ml. of distilled water and sucked dry. If desired, a centrifuge or filter press could be used for the latter operations. The wet product weighed 97.5 g. It contained 70.0 g. of oxide, of which 1.4% was $Cb_2O_5$ and the rest $Ta_2O_5$. The $TiO_2$ content was less than 0.03%. The wet cake also contained 5.92 g. of $NH_4^+$ and 14.25 g. of $F^-$.

The molar ratio $NH_4^+:Ta:F^-$ was therefore 1.05;1:2.4 and the recovery of tantalum (as $Ta_2O_5$) was 74.5% of that present in the starting material. Had the amount of ammonia actually added been less than that required by theory for Equation 5, the reduction of the columbian content would have been greater, but the recovery of tantalum values as ammonium oxyfluotantalate would have been somewhat less.

Example 5

In the preceeding examples the object was to separate tantalum from columbium with efficient recovery of the tantalum values. In the following example, a portion of a precipitate obtained in a manner similar to that described in Example 1 was subjected to successive leachings with distilled water until the molar ratio $$NH_4^+:Ta:F^-$$

in the liquid and solid phases was essentially identical, thereby indicating that the salt was substantially free from either more or less soluble impurities.

The moist filter cake used as the starting material weighed 405 g. and the molar ratio $NH_4^+:Ta:F^-$ was 1.14:1:2.66 (on a dry basis). This cake was stirred in distilled water for 30 minutes and then filtered on a Büchner funnel with suction. A small portion of the moist filter cake was dried to constant weight at 110° C. Samples of the filtrate, moist filter cake, and the dried filter cake were analyzed for ammonia, tantalum, and fluoride, and the molar ratio $NH_4^+:Ta:F^-$ was calculated for each. This process was repeated four more times using the moist filter cake remaining from the preceding treatment. The results are summarized in the accompanying table.

It will be noted that the molar ratios for fluoride and ammonia in the filtrate from the first treatment are inordinately high, indicating the presence of ammonium fluoride in the starting material. By the fifth treatment the molar ratio $NH_4^+:Ta:F^-$ was substantially identical for the filtrate, moist filter cake and the dried filter cake. This confirms the empirical formula $NH_4TaO(OH)_{1.5}F_{2.5}$ for the ammonium oxyfluotantalate of the present invention within the limits of accuracy of the fluoride analysis.

|  | Starting Material | Treatment | | | | |
|---|---|---|---|---|---|---|
|  |  | #1 | #2 | #3 | #4 | #5 |
| Wt. of filter cake treated, g.. |  | 405 | 375 | 294 | 235 | 178.5 |
| Volume of $H_2O$ used, ml.. |  | 592 | 548 | 430 | 344 | 261 |
| Mole ratios: |  |  |  |  |  |  |
| Filtrate— |  |  |  |  |  |  |
| $NH_4^+$ |  | 34.4 | 1.59 | 1.13 | 1.05 | 1.02 |
| Ta |  | 1.0 | 1.0 | 1.0 | 1.0 | 1.0 |
| $F^-$ |  | 41.8 | 3.25 | 2.76 | 2.69 | 2.63 |
| Wet Cake— |  |  |  |  |  |  |
| $NH_4^+$ |  | 1.03 | 1.05 | 1.02 | 1.05 | 1.01 |
| Ta |  | 1.0 | 1.0 | 1.0 | 1.0 | 1.0 |
| $F^-$ |  | 2.68 | 2.79 | 2.68 | 2.69 | 2.66 |
| Dried Cake— |  |  |  |  |  |  |
| $NH_4^+$ | 1.14 | 1.02 | 1.01 | 1.01 | 0.99 | 0.98 |
| Ta | 1.0 | 1.0 | 1.0 | 1.0 | 1.0 | 1.0 |
| $F^-$ | 2.66 | 2.68 | 2.64 | 2.62 | 2.62 | 2.62 |

The difficulties inherent in the quantative determination of fluoride are generally recognized, and none of the available analytical procedures is entirely satisfactory from the standpoint of accuracy and precision. The fluoride data given in the preceding examples is considered to be accurate to ±10%, and possibly ±5%, but greater accuracy than this cannot reasonably be assumed.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

We claim:

1. A crystalline ammonium oxyfluotantalate, having a characteristic X-ray diffraction pattern, in which the molar ratio $NH_4^+:Ta$ is approximately 1:1 and the molar ratio $F^-:Ta$ is approximately 2.5:1, the empirical composition of said ammonium oxyfluotantalate corresponding to the formula $NH_4TaO(OH)_{1.5}F_{2.5}$.

2. A crystalline ammonium oxyfluotantalate, having a characteristic X-ray diffraction pattern and a solubility in water corresponding to approximately 20 to 30 g. of $Ta_2O_5$ per liter, in which the molar ratio $NH_4^+:Ta$ is approximately 1:1 and the molar ratio $F^-:Ta$ is approximately 2.5:1, the empirical composition of said ammonium oxyfluotantalate corresponding to the formula $NH_4TaO(OH)_{1.5}F_{2.5}$.

3. The method of preparing a crystalline ammonium oxyfluotantalate having a characteristic X-ray diffraction pattern and having the empirical formula $$NH_4Ta(OH)_{1.5}F_{2.5}$$

which comprises adding ammonia to a solution of $(NH_4)_2TaF_7$, the amount of ammonia added being not substantially less than 1.75 and not substantially greater than 3.5 moles of ammonia for each mole of $(NH_4)_2TaF_7$ in the solution.

References Cited in the file of this patent

UNITED STATES PATENTS

| 1,731,364 | Bichowsky | Oct. 15, 1929 |
| 1,908,473 | Cunningham et al. | May 9, 1933 |
| 1,923,652 | Winkler et al. | Aug. 22, 1933 |
| 2,812,234 | Robinson | Nov. 5, 1957 |
| 2,819,945 | Ruhoff et al. | Jan. 14, 1958 |